(No Model.) 8 Sheets—Sheet 1.

M. HEARN & M. DONNE.
TYPE WRITING MACHINE.

No. 464,868. Patented Dec. 8, 1891.

Witnesses.
Fred G. Dieterich
Jos. A. Ryan

Inventors
Michael Hearn.
Morgan Donne.
by Munn & Co.
Attorneys (No Model.) 8 Sheets—Sheet 2.

M. HEARN & M. DONNE.
TYPE WRITING MACHINE.

No. 464,868. Patented Dec. 8, 1891.

Witnesses.
Fred G. Dieterich
Jos. A. Ryan

Inventors
Michael Hearn.
Morgan Donne.
by Munn & Co
Attorneys.

(No Model.) 8 Sheets—Sheet 3.

M. HEARN & M. DONNE.
TYPE WRITING MACHINE.

No. 464,868. Patented Dec. 8, 1891.

Witnesses.
Fred G. Dieterich
Jos. A. Ryan

Inventors.
Michael Hearn
Morgan Donne
by Munn & Co
Attorneys.

(No Model.) 8 Sheets—Sheet 4.
M. HEARN & M. DONNE.
TYPE WRITING MACHINE.
No. 464,868. Patented Dec. 8, 1891.
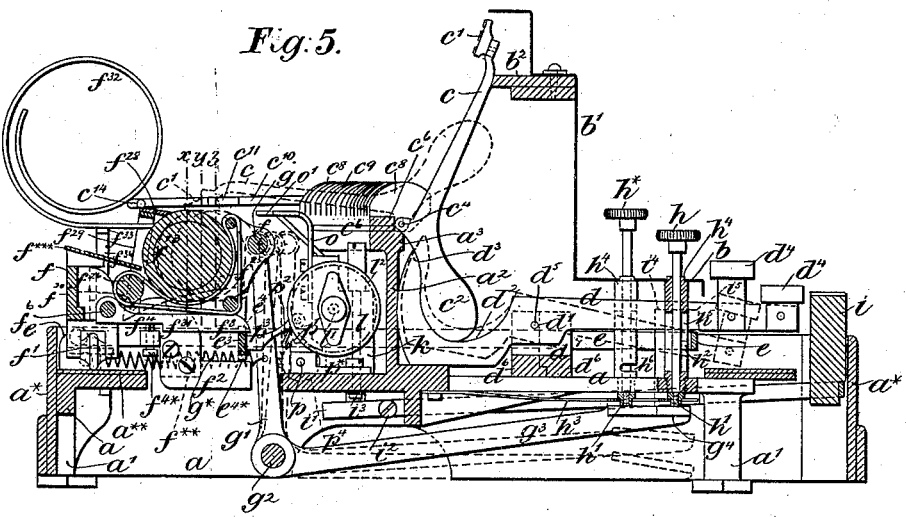
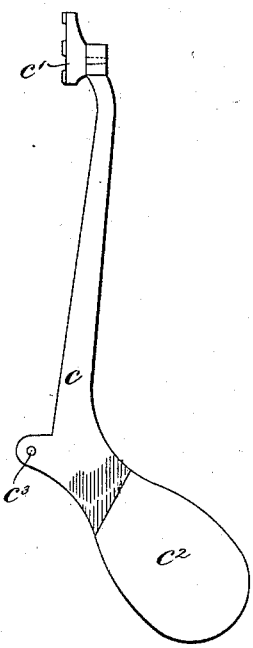
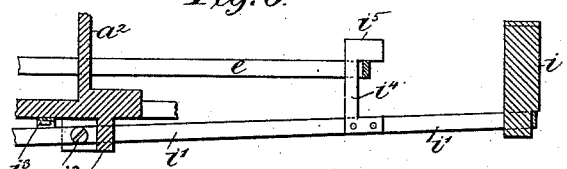
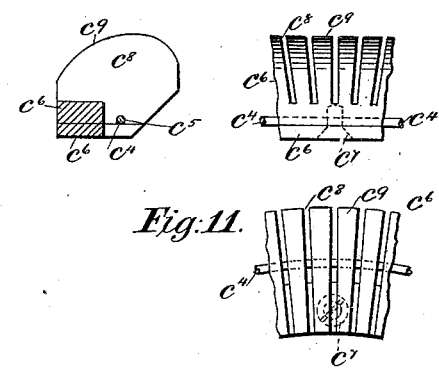

(No Model.) 8 Sheets—Sheet 5.
M. HEARN & M. DONNE.
TYPE WRITING MACHINE.
No. 464,868. Patented Dec. 8, 1891.
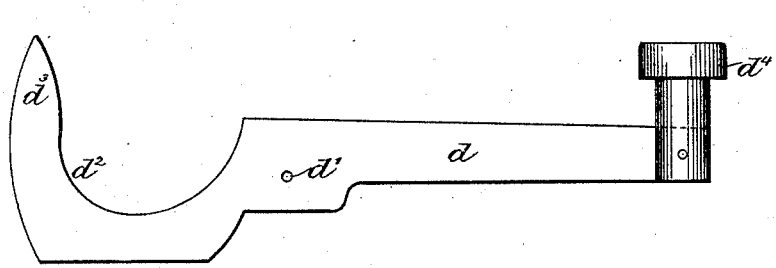
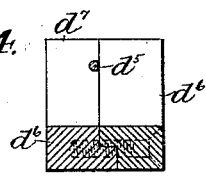
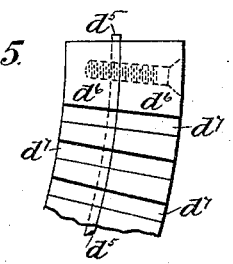
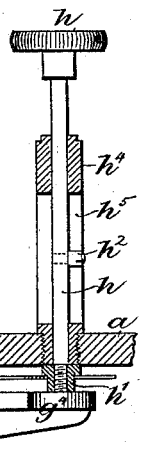
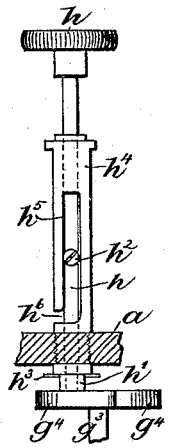

(No Model.) 8 Sheets—Sheet 6.
M. HEARN & M. DONNE.
TYPE WRITING MACHINE.

No. 464,868. Patented Dec. 8, 1891.

Witnesses
Fred G. Dieterich
Jos. A. Ryan

Inventors
Michael Hearn
Morgan Donne
by Munn & Co
Attorneys

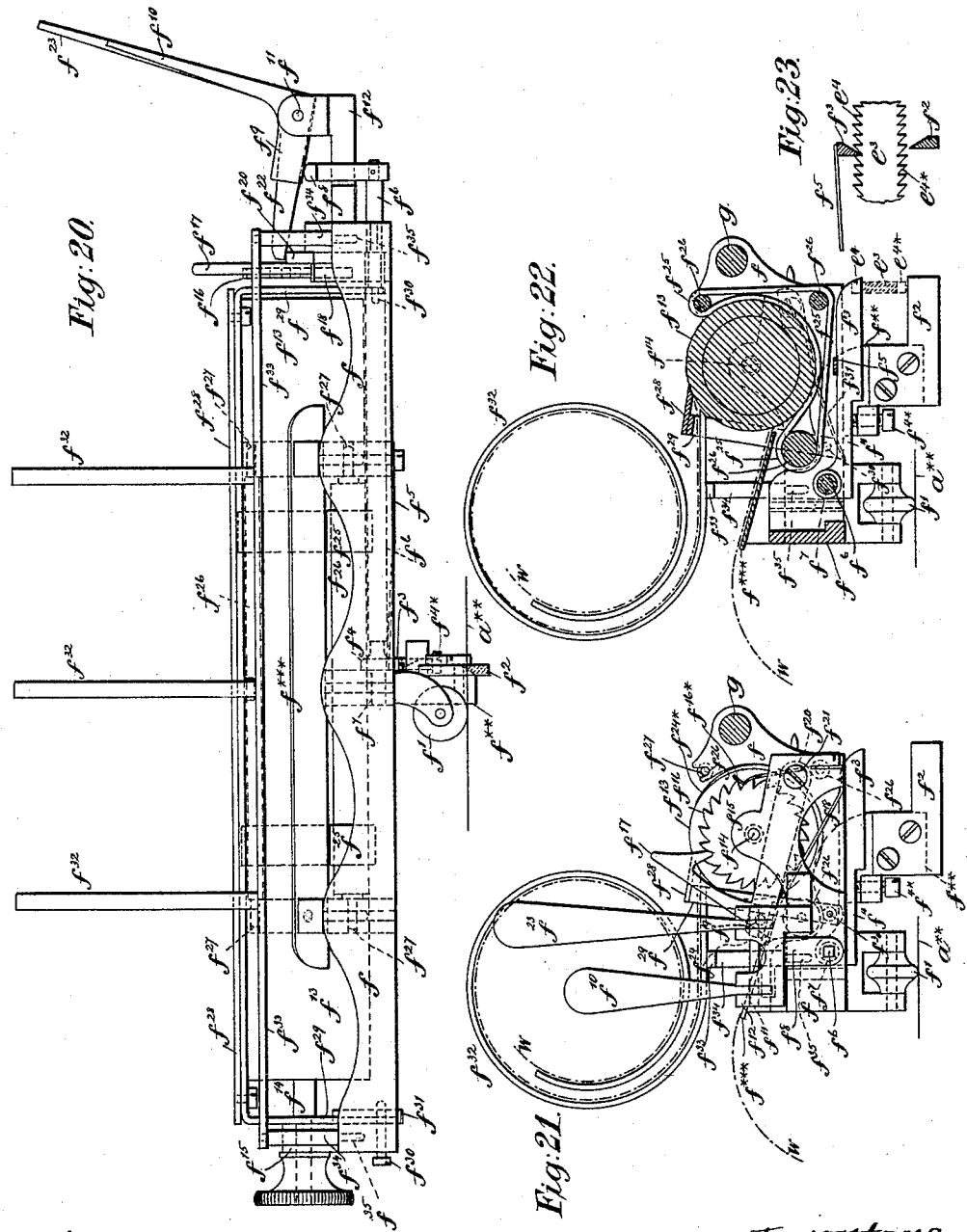

(No Model.) 8 Sheets—Sheet 8.
M. HEARN & M. DONNE.
TYPE WRITING MACHINE.
No. 464,868. Patented Dec. 8, 1891.
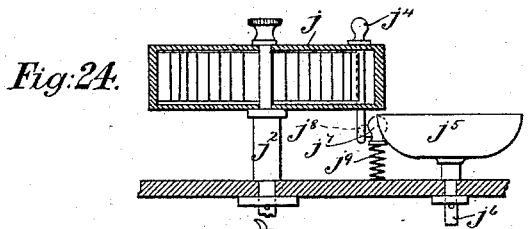
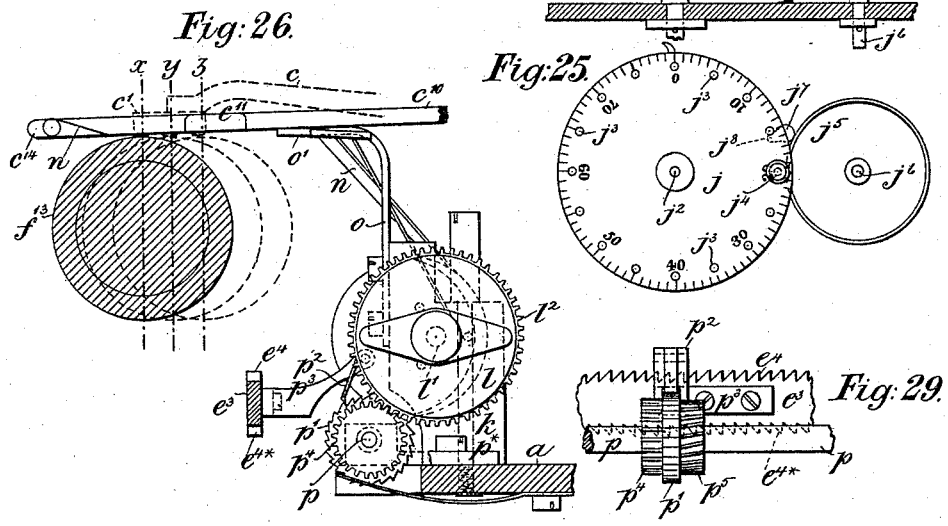
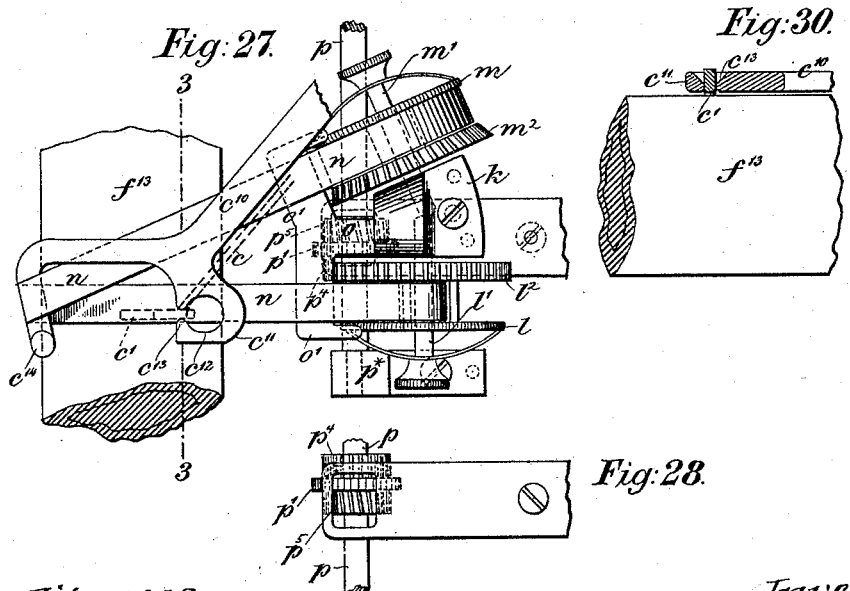
Witnesses
Fred G. Dieterich
Jos. A. Ryan
Inventors
Michael Hearn
Morgan Donne
by Munn & Co
Attorneys

UNITED STATES PATENT OFFICE.

MICHAEL HEARN AND MORGAN DONNE, OF LONDON, ENGLAND.

TYPE-WRITING MACHINE.

SPECIFICATION forming part of Letters Patent No. 464,868, dated December 8, 1891.

Application filed October 30, 1890. Serial No. 369,858. (No model.)

*To all whom it may concern:*

Figure 1:
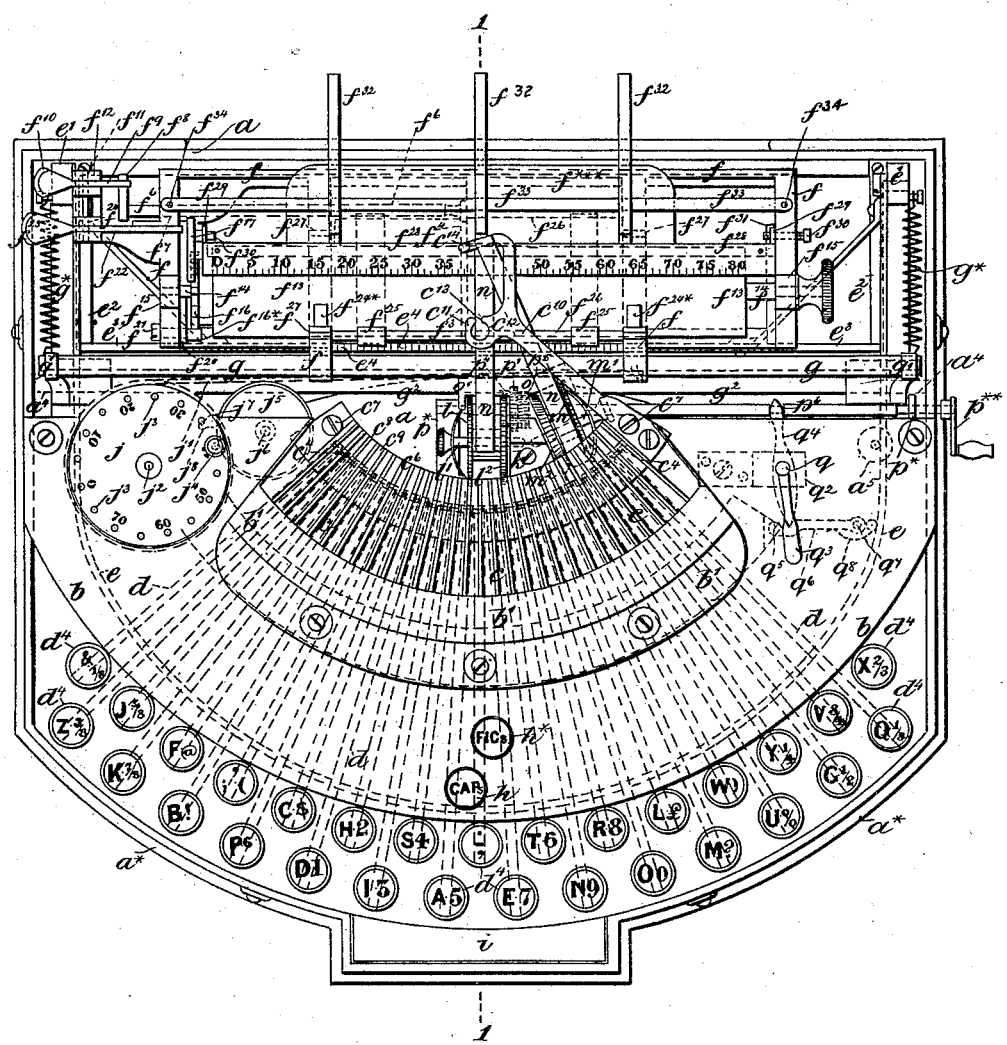
Figure 2:
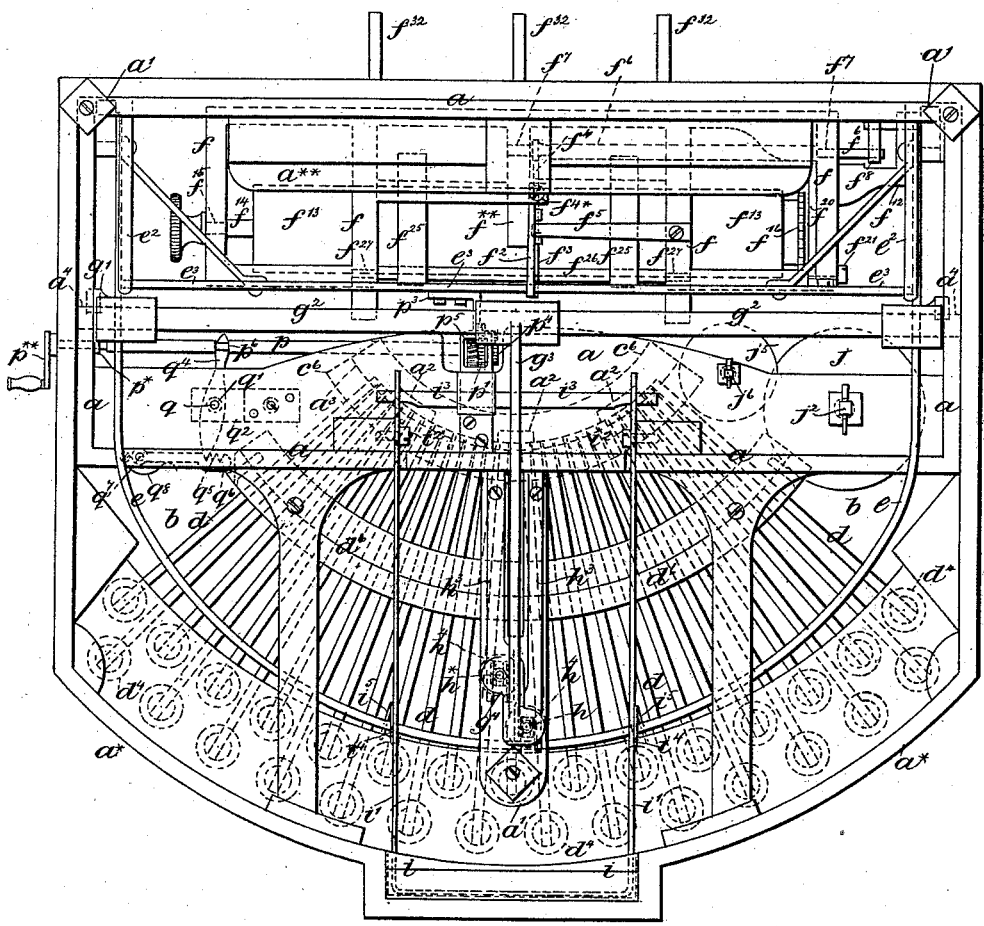
Figure 3:
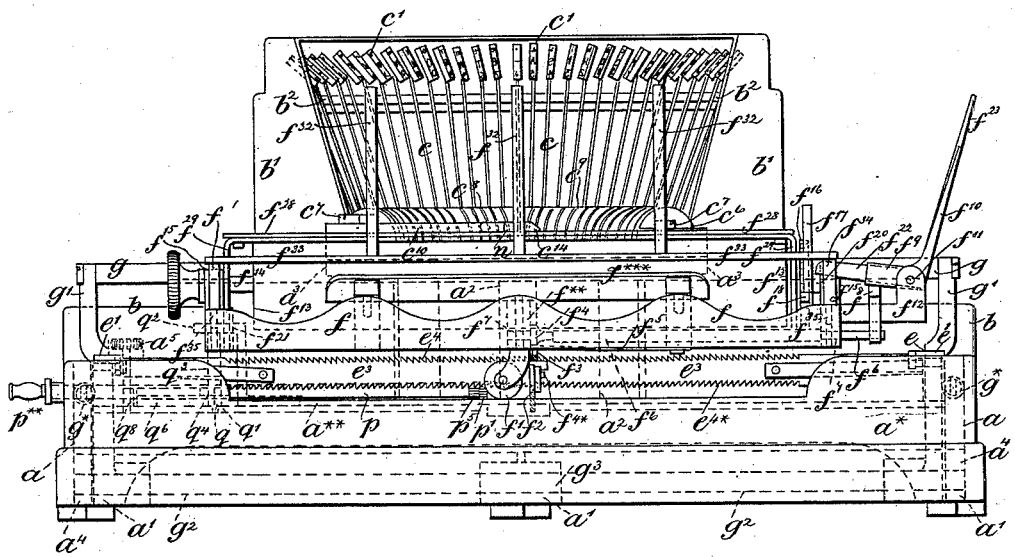
Figure 4:
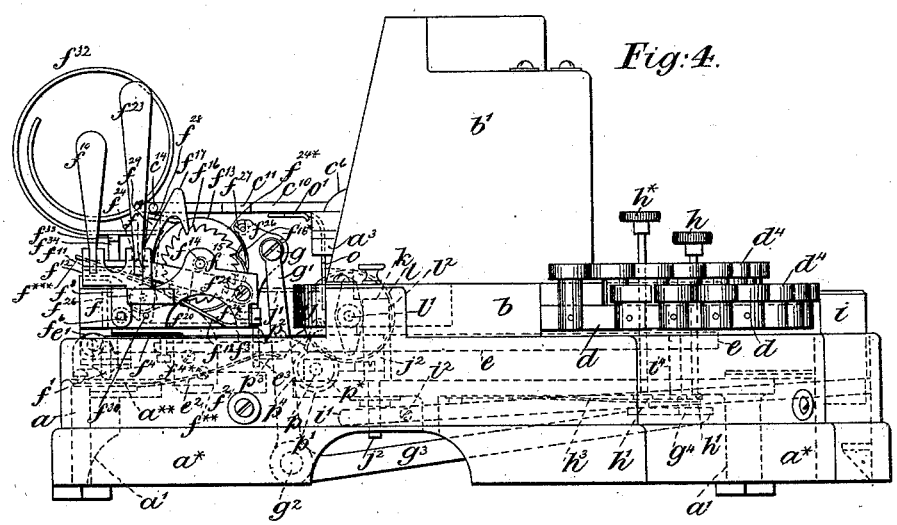
Figure 18:
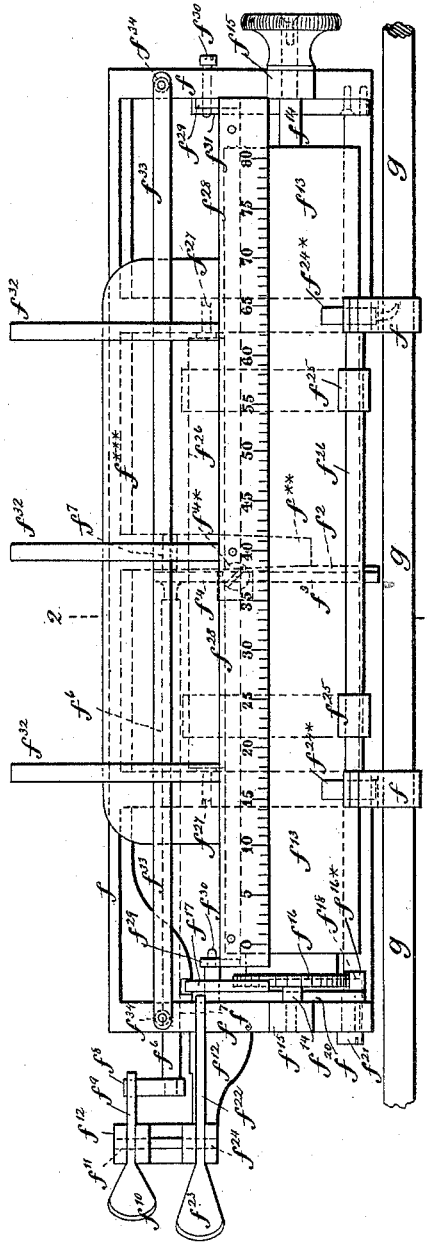
Figure 19:
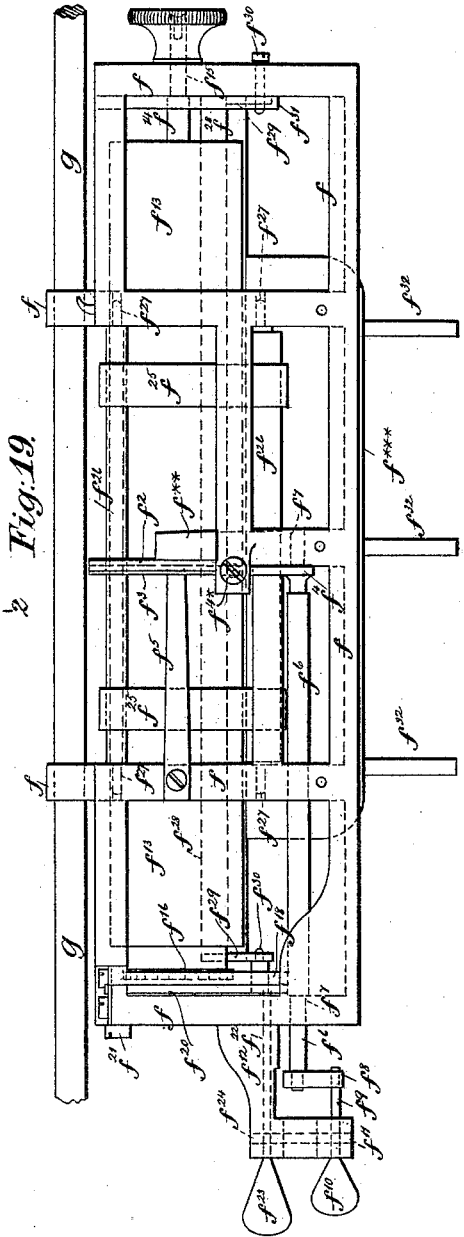

Be it known that we, MICHAEL HEARN, secretary to the English Type-Writer, Limited, of 6 Birchin Lane, in the city of London, England, and MORGAN DONNE, manager of the works of the said company, of 6 Birchin Lane aforesaid, have made an Improvement in Type-Writing Machines; and we, the said MICHAEL HEARN and MORGAN DONNE, do hereby declare the nature of the said invention and in what manner the same is to be performed to be particularly described and ascertained in and by the following statement thereof, reference being had to the drawings hereunto annexed, and to the letters marked thereon, like parts being indicated by similar letters of reference—that is to say:

Figure 1 represents a plan of a machine constructed according to our invention. Fig. 2 is an under side view thereof. Fig. 3 is a rear elevation thereof. Fig. 4 is a side elevation thereof. Fig. 5 is a vertical transverse section thereof, taken on the line 1 1 of Fig. 1. Fig. 6 is a detail view showing the broad spacer-key and connected parts separately. Fig. 7 is a side view of one of the type-levers separately. Fig. 8 is an edge view thereof. Fig. 9 is a transverse section of the semicircular plates or guide-comb for the type-levers. Fig. 10 is an elevation of part thereof. Fig. 11 is a plan thereof. Fig. 12 is a side view of one of the key-levers separately, and Fig. 13 is an end view thereof. Fig. 14 is a transverse section of the slotted segment or comb for supporting the key-levers. Fig. 15 is a plan of part thereof. Fig. 16 is a sectional side view showing separately one of the pistons or keys and connected parts for moving forward the paper-carriage. Fig. 17 is an end view thereof. Fig. 18 is a plan of the paper-carriage separately. Fig. 19 is an under side view thereof. Fig. 20 is a rear elevation thereof. Fig. 21 is an end elevation thereof. Fig. 22 is a transverse section thereof, taken on the line 2 2 of Fig. 18. Fig. 23 is a detail view of the escapement-rack bar and pallets separately. Fig. 24 is a sectional elevation of the spring-drum and device for giving an audible indication during the traverse of the paper-carriage, and Fig. 25 is a plan thereof. Fig. 26 is a side view of the ribbon-spools, the alignment device, and connected parts separately. Fig. 27 is a plan thereof. Fig. 28 is an under side view showing the shunt-wheels and some connected parts separately. Fig. 29 is an elevation of the shunt-wheels, the escapement-rack, and some connected parts separately, looking toward the rear of the machine. Fig. 30 is a vertical section of parts taken on the line 3 3 of Fig. 27, showing a type-piece in position for printing. Figs. 7 to 17 and 26 to 30 are drawn to twice the scale of Figs. 1 to 6, while Figs. 18 to 25 are drawn to a scale one-third less than that of Figs. 7 to 17 and 26 to 30.

$a$ represents the frame of the machine, $a^*$ represents a casing which is attached thereto, and $a'$ represents parts of the framing which form feet upon which the machine is supported, and $b$ represents a cap or cover which incloses some of the working parts.

$c'$ represents the type pieces or blocks, which are fixed upon the upper ends of type-levers $c$, and these type-levers are mounted upon an axis of motion $c^4$, common to all and arranged in the arc of a circle. The type-levers $c$ at their lower ends are cranked or curved and spread out or enlarged to form weighted heels $c^2$ in order to counterbalance and normally retain them in a position slightly reclining from a vertical plane, in which position they rest against an india-rubber cushion or buffer $b^2$, arranged within a semicircular hood or shield $b'$, which forms part of the cap or cover $b$, and partially incases the type-levers $c$, as shown more particularly at Fig. 5. The type pieces or blocks $c'$ are each formed with an elongated face upon which are provided three distinct characters, such as a small letter of the alphabet, a capital letter, and a numeral, as will be seen more clearly in reference to Fig. 8, and each of these characters is capable of being brought into use at the times desired, as hereinafter more fully described. The type-levers $c$ are, near to their heels $c^2$, formed with holes $c^3$ therein, through which is passed a wire $c^4$, bent into a semicircular form, and which constitutes their axes, and this bent wire $c^4$ is clamped in a groove $c^5$, formed in one of the meeting faces of two segmental or semicircular plates $c^6$, which are clamped together by means of screws $c^7$, and are fixed upon a semicircular bar $a^3$, supported upon posts $a^2$, forming part of the framing $a$, and the semicircular plates $c^6$ are formed with radial open-ended slots $c^8$, within each of which a type-lever $c$ is located, and they are thus equally spaced, while the upper one of these slotted plates $c^6$ is formed with vertical partition-walls $c^9$ between each slot in order to form a kind of comb to guide the type-levers $c$ to the printing-point. By these means the type-levers may be readily and equally mounted in position, while any one of them may be easily dismounted for repairs or other purposes and replaced by another. The type pieces or blocks $c'$, from the center of the arc or semicircle toward each end thereof, are each fixed upon its lever $c$ at such an angle as will cause it at the moment of giving its impression to assume a position at right angles to the line of printing, as will be readily understood upon reference to Figs. 3 and 27, and in order that each type-piece $c'$ may be guided truly to the printing-point and steadied at the moment of giving its impression, we employ an alignment device constructed as follows: To the slotted segment $c^6$ of the type-levers $c$ we fix one end of an arm $c^{10}$, upon the side of which near the printing-point is formed a bracket or projection $c^{11}$, which is formed with an opening $c^{12}$ in the center thereof, somewhat in the form of a horseshoe, and at the rear of this opening $c^{12}$ a slot or passage $c^{13}$ is cut through the bracket, the walls of the slot or passage being formed with inclined faces, constituting a guide into which each type piece or block $c'$ is received in its descent. By the peculiar formation of the bracket or projection $c^{11}$ a clear way is left between and adjacent to the inclined walls of the slot $c^{13}$ for the passage of the type pieces or blocks $c'$, and in order to prevent the type-levers $c$ in their descent coming into contact with the bracket $c^{11}$ such levers $c$ at their ends are slightly cranked or bent for that purpose. By these means the type pieces or blocks $c'$ will be truly guided to the printing-point and there held firmly during the printing operation, as shown more particularly at Figs. 27 and 30, while at the same time an unobstructed view can be obtained of the printing at the rear of the alignment device immediately that the impression has been given.

The ends of the type-levers $c$, carrying the type pieces or blocks $c'$, are impelled to the printing-point by means of corresponding key-levers $d$, which are mounted in a comb or radially-slotted segment in a somewhat similar manner to that described with respect to the type-levers—that is to say, they are formed with holes $d'$ therethrough to receive a semicircular wire $d^5$, which forms an axis common to all, and this wire $d^5$ is received in a groove formed in one of two slotted plates or bars $d^6$, which are clamped together by means of screws and fixed to the framing $a$, the key-levers $d$ being located and working in the slots $d^7$ of the segment $d^6$. The key-levers $d$ act upon the weighted heels $c^2$ of the type-levers $c$ in order to give the required impulse thereto, and the key-levers $d$ are at their inner ends formed with hollows or depressions $d^2$ to receive the corresponding curved weighted heels $c^2$ of the type-levers $c$, and beyond such hollows or depressions the key-levers $d$ are formed with vertical noses $d^3$, shaped to a point, and such points are so located as to strike or act upon the type-levers $c$ near to their axes $c^4$, and thus produce a quick or sudden action of such levers $c$. The outer ends of the key-levers $d$ are fitted with keys $d^4$, arranged in two curved rows for convenience of manipulation and each marked with similar characters to those upon the face of the corresponding type piece or block $c'$, and the key-levers $d$ are held in and returned to their normal position by the weighted heels $c^2$ of the type-levers $c$.

A curved spacing-bar $e$ is arranged immediately beneath the key-levers $d$ near to their outer ends, and this curved spacing-bar $e$ is continued to the rear of the machine, where it is mounted upon centers of motion $e'$, carried by the framing $a$, and is acted upon by springs $e^2$, which normally retain it in its raised position immediately beneath the key-levers $d$ and against a stop $a^5$ upon the frame $a$, so that it is capable of being depressed by any one of such levers, and the curved spacing-bar $e$ has fixed thereto near to its ends, and so as to extend across the machine, an escapement-rack bar $e^3$, which is formed with ratchet-teeth $e^4$ $e^{4*}$, upon its upper and lower edges and partakes of the downward and upward movements of the spacing-bar $e$.

The paper-carriage consists of a frame $f$, which at its front is mounted with capability of sliding upon a bar $g$, which is carried by vertical arms $g'$, rising from a rock-shaft $g^2$, at its ends mounted in bearings $a^4$, carried by the framing $a$, and the arms $g'$ are acted upon by springs $g^*$, at one end attached thereto and at the other end attached to the framing $a$ to normally retain the carriage $f$ and cylindrical platen $f^{13}$ (hereinafter more fully referred to) in such a position that the paper will receive the impression of the ordinary small typographical characters, while the carriage $f$ at its rear is supported upon a caster-wheel $f'$, which traverses a horizontal table $a^{**}$, carried by the framing $a$, and the carriage $f$ is thus adapted to receive the necessary spacing or escapement movements across the machine and to be moved forward into position for the paper to receive the impression of either the capitals or numerals, according to the extent of such movement, as indicated by the dotted lines $x$ $y$ $z$ in Figs. 5 and 26. The forward movement of the paper-carriage is obtained by means of a lever $g^3$, which is at one end fixed to the rock-shaft $g^2$ and at the other end is spread out or formed with enlargements $g^4$, in order that it may be acted upon by either one of two pistons $h$ $h^*$, the one $h$ of which represents the capitals and is capable of being depressed a given distance, while the other $h^*$ represents the numerals and is capable of twice the amount of depression, and the paper-carriage $f$ is thus, through the rock-shaft $g^2$ and vertical arms $g'$, moved forward the required distance. The pistons $h\,h^*$ are fitted with capability of vertical movement in tubular fittings or guides $h^4$, fixed to the framing $a$, and at their lower ends they are threaded to receive nuts $h'$, which act as stops to limit their upward movement, and they are held in their raised or normal position by means of springs $h^3$, which at one end are fixed to the frame $a$ and at the other end are formed with holes or slots therein to fit the nuts $h'$, while the pistons $h\,h^*$ are each provided with a stud or projection $h^2$, or it might be a feather, which normally travels in a vertical slot or groove $h^5$, formed in the tubular fitting or guide $h^4$, (shown more particularly at Figs. 16 and 17,) but which in the depressed position of the piston $h$ or $h^*$ is capable, by giving a partial revolution to the piston, of being turned into a right-angle slot or recess $h^6$ in order to hold such piston depressed when it is desired to print a number of capitals or numerals in succession. It will be understood that in order to admit of the extra depression of the piston $h^*$ the position of the stud or projection $h^2$ thereon must be arranged accordingly.

A broad spacer-key $i$, adapted to act upon the curved spacing-bar $e$, is located immediately in front of the type-keys, so that the curved spacing-bar $e$ may be actuated without giving motion to the key-levers $d$ when it is desired to leave spaces between words or sentences, and in order that the spacer-key $i$ may not be affected by the depression of the key-levers $d$ we fix it to the outer ends of independent arms or levers $i'$, (shown more clearly at Fig. 6,) which are near to their inner ends mounted upon axes or centers of motion $i^2$, formed by screws screwing into the frame $a$, and beyond such axes $i^2$ the ends of the levers $i'$ are acted upon by a spring $i^3$ to normally retain the spacer-key $i$ in its raised position, and the levers $i'$ are provided with short vertical standards $i^4$, formed with horizontal arms $i^5$, adapted to engage the curved spacing-bar $e$ in the downward motion of the spacer-key $i$, but leaving the curved spacing-bar $e$ free to move independently thereof when depressed by a key-lever $d$.

The paper-carriage $f$ is traversed across the machine in one direction and during the printing operation by means of a chain $j'$, one end of which is attached to the paper-carriage $f$ and the other end of which is attached to a spring-drum $j$, mounted with capability of revolution upon a vertical spindle $j^2$, fixed to the framing $a$, and which drum $j$ exerts a constant pull upon the paper-carriage $f$, while the traverse of the paper-carriage $f$ is controlled by means of an escapement or spacing device, which permits the paper-carriage $f$ to advance only the distance of one letter at each depression of a key $d^4$. This escapement device consists of the escapement-rack bar $e^3$, hereinbefore referred to and which is carried by the spacing-bar $e$, and two broad pallets $f^2\,f^3$, the upper one $f^3$ of which constantly remains in engagement with the corresponding teeth $e^4$ of the escapement-rack bar $e^3$ during the forward and backward movements of the paper-carriage $f$, controlled by the lever $g^3$ and pistons $h\,h^*$. The pallets $f^2\,f^3$ are carried by a bracket or bar $f^{**}$ of the paper-carriage $f$, and they are arranged one in advance of the other to the extent of half a tooth of the escapement-racks $e^4\,e^{4*}$, while the escapement-rack $e^4$ is normally held in engagement with the upper one $f^3$ of such pallets by the upward tendency of the curved spacing-bar $e$. By this arrangement of parts at every depression of a key $d^4$ or of the spacer-key $i$ the curved spacing-bar $e$ will be depressed and the escapement-rack $e^4$ will be disengaged from the upper pallet $f^3$ and brought into engagement with the lower one $f^2$, and upon the spacing-bar $e$ rising and returning to its normal position the reverse action will take place, and the paper-carriage $f$ will thus be permitted to advance the distance of one tooth of the escapement-racks $e^4\,e^{4*}$ at every depression of a key $d^4$ or of the spacer-key $i$.

In order to disengage the upper pallet $f^3$ from the corresponding escapement-rack $e^4$ and permit the carriage $f$ to be freely traversed to and fro across the machine for the purpose of adjusting the position of the sheet of paper being printed upon in relation to the printing-point or commencing a fresh line of printing, we, as shown more particularly at Figs. 18 to 22, mount or form the upper pallet $f^3$ upon an arm $f^4$, which is acted upon by a spring $f^5$ to hold the pallet $f^3$ in position to engage the escapement-rack $e^4$ and is fixed upon a shaft or spindle $f^6$, mounted in bearings $f^7$, formed in the carriage-frame, and which shaft $f^6$ extends to the end of the carriage-frame, where it terminates in an offset $f^8$, which is capable of being acted upon by the short arm $f^9$ of a bell-crank-releasing lever $f^{10}$, mounted upon an axis of motion $f^{11}$, supported in a bracket $f^{12}$ from the carriage $f$ in order to partially rotate the shaft or spindle $f^6$, and the upper pallet $f^3$ is thus disengaged from the corresponding escapement-rack $e^4$. The position of the upper pallet $f^3$ in relation to the escapement-rack $e^4$ is capable of regulation by means of a set-screw $f^{4*}$, passing through a tapped hole in the carriage-frame $f$ and at its end bearing against the under side of the supporting-arm $f^4$ of the upper pallet $f^3$. As the upper pallet $f^3$ is disengaged from the escapement-rack $e^4$, generally in order that the carriage may be traversed across the machine to the starting-point to commence a fresh line of printing, it is desirable at the same time to rotate the cylindrical platen $f^{13}$ the distance of the space between two lines, and thus bring a fresh surface of paper into alignment with the printing-point. To attain this end we fix the cylindrical platen $f^{13}$, which is preferably a hard wood or metal roller covered with india-rubber, as is well understood, upon a shaft or spindle $f^{14}$, which is at each end mounted with capability of revolution in bearings $f^{15}$, formed in the framing $f$ of the carriage, and we fix upon the shaft or spindle $f^{14}$ at one end of the cylindrical platen $f^{13}$ a ratchet-wheel $f^{16}$, with which engages a clawker or driver $f^{17}$, which is held up to its work by a spring $f^{18}$. The clawker or driver $f^{17}$ is mounted with capability of oscillation upon a stud or axis $f^{19}$, carried by one end of an arm or lever $f^{20}$, which at its other end is mounted upon an axis of motion $f^{21}$, carried by the carriage-frame $f$, and the arm or lever $f^{20}$ is acted upon by the short arm $f^{22}$ of a bell-crank lever $f^{23}$, mounted upon an axis $f^{24}$, supported by the bracket $f^{12}$ to cause the clawker or driver $f^{17}$ to rotate the cylindrical platen $f^{13}$, and as the bell-crank lever $f^{22}$ for rotating the platen $f^{13}$, and which we will call the "platen-feed" lever, is mounted parallel with the pallet-releasing lever $f^{10}$ the same movement of the hand which is required to actuate the lever $f^{23}$ and to traverse the carriage across the machine may also be caused to actuate the lever $f^{10}$.

In order to prevent the too free revolution of the cylindrical platen $f^{13}$ and to enable the operator readily to know the extent to which it is being moved, a spring stop $f^{16*}$, mounted upon the carriage-frame $f$, is caused to engage the recesses between the teeth of the ratchet-wheel $f^{16}$, and in rising and falling as it is displaced by such teeth clearly gives the required indication.

The sheet of paper $w$ is held in contact with the cylindrical platen $f^{13}$ by means of two semicircular spring bands or fingers $f^{24*}$, which are at one end fixed to the frame $f$ of the carriage and at the other end bear upon the platen $f^{13}$ near to the printing-line with an elastic pressure. The paper $w$ is passed over a table $f^{***}$, and, as shown at Figs. 21 and 22, it is carried forward, together with the platen $f^{13}$ as it is rotated by the platen feed-lever $f^{28}$, by means of two endless bands $f^{25}$ of india-rubber, which are passed around three rollers $f^{26}$, located around one side of the cylindrical platen $f^{13}$ and mounted with capability of free revolution in bearings $f^{27}$, formed in the carriage-frame $f$, the bands $f^{25}$ being thus held in frictional contact with, so as to be driven by, the platen $f^{13}$. After passing the printing-line the paper $w$ is carried under a bar $f^{28}$, which is marked with a divided scale, as is well understood, and is fixed upon the upper ends of arms $f^{29}$, which are at their lower ends mounted upon axes of motion $f^{30}$, carried by the frame $f$ and acted upon by a spring $f^{31}$, in order to hold the bar $f^{28}$ against the platen $f^{13}$ with a light spring pressure, and as the sheet of paper $w$ passes under the bar $f^{28}$ it is received by a curling guide consisting of three bars $f^{32}$, coiled in the form of a scroll or scrolls or the outer coil or coils of a flat helix, and fixed upon a horizontal bar $f^{33}$, supported upon legs or posts $f^{34}$, removably fitting into holes or sockets $f^{35}$, formed in the carriage-frame $f$. By means of this device the sheet of paper $w$, as it leaves the platen $f^{13}$, is curled or rolled up in the form of a scroll with the printing inside, so that it may be left in the machine without fear of the printing being read by a person other than the operator and such as a casual caller, thus obviating the necessity for removing the sheet from the machine in order to conceal the writing, while at the same time the paper is truly guided, and the risk of its position being disarranged by the top edge thereof coming into contact with an object upon the table of the operator is avoided.

In order to give an audible indication when the paper-carriage $f$ has traversed a predetermined distance governing the length of the line of printing, and to regulate that point in the traverse of the paper-carriage at which such audible indication shall be given, we arrange around the upper side of the spring-drum $j$ and which is mounted flush with the cover $b$ of the machine, so as to appear through a corresponding aperture formed therein, a circular scale graduated to correspond with that upon the divided bar $f^{28}$, and we form the drum $j$ with a number of holes $j^3$ therethrough, arranged in a circle adjacent to the divided scale and corresponding with certain of the divisions thereof, and we provide a loose pin $j^4$, which is adapted to fit into the holes $j^3$ and pass through the drum $j$ and project from the lower side thereof. Below and at the side of the spring-drum $j$ and mounted upon a post $j^6$, fixed to the frame $a$, is arranged a bell or gong $j^5$, and at the side of the bell or gong $j^5$ is located a hammer or striker $j^7$, which is fixed upon one end of a coiled-spring arm $j^9$, the other end of which is fixed to the frame $a$, as shown more particularly at Figs. 24 and 25, and the projecting lower end of the pin $j^4$ in the revolution of the drum is adapted to act upon the nose $j^8$ of the hammer or striker $j^7$, and thereby to sound the bell or gong $j^5$. It will thus be seen that by placing the loose pin $j^4$ in any given hole $j^3$ of the circle the bell or gong $j^5$ may be caused to sound an alarm at any predetermined point of the traverse of the paper-carriage.

The spools carrying the inking-ribbon, instead of being mounted upon inclined axes, as heretofore, are arranged in the following manner, and as shown more particularly at Figs. 26 and 27. The shafts or axes $l'\, m'$ of the spools $l\, m$ are screwed into tapped holes formed in a short standard $k$, fixed to the frame $a$ immediately beneath the slotted segment $c^6$, and the shaft or axis $l'$ is arranged in a position parallel with the axis of the platen $f^{13}$ and so that the ribbon $n$, winding off the spool $l$, passes over the a guide-bar $o'$, formed on a standard $o$, fixed to the standard $k$, thence beneath the alignment-bracket $c^{11}$ in a direction at right angles to the axis of the platen $f^{13}$. The ribbon $n$ thence passes around an angularly-disposed bar $c^{14}$, formed on the arm or bracket $c^{10}$ of the slotted segment $c^6$, and it then returns in an angular direction over the angular bar $o'$ to the other ribbon-spool $m$, whose shaft or axis $m'$ is correspondingly disposed at right angles to such direction. By this arrangement of the spools $l'$ $m'$ the printing is less obscured by the ribbon $n$ than when the axes of both spools are arranged at equal angles to a line drawn at right angles to the platen $f^{13}$, as heretofore. In order to give a step-by-step motion to the inking-ribbon $n$, the spools $l'$ $m'$ have fixed upon the inner sides thereof toothed wheels $l^2$ $m^2$, the wheel $l^2$ having simple spur-teeth, while the wheel $m^2$ is provided with beveled teeth. Between these wheels $l^2$ $m^2$ and fixed upon a horizontal shaft $p$, mounted in bearings $p^*$ on the frame $a$ and disposed parallel to the axis of the platen $f^{13}$ and capable of endwise and rotary motion, is a broad ratchet-wheel $p'$, which is adapted to receive a step-by-step motion at each depression of the spacing-bar $e$ from a pawl $p^2$, carried by a horizontal arm $p^3$, fixed to the escapement-rack bar $e^3$, and upon each side of the ratchet-wheel $p'$, and fixed thereto or formed thereon, is a pinion, one $p^4$ of such pinions being formed with spur-teeth to engage the corresponding teeth of the wheel $l^2$ of the spool $l$, while the other $p^5$ of such pinions is formed with angular or spiral teeth to engage the beveled teeth of the corresponding spool-wheel $m^2$; but such compound or shunt wheel $p^4 p' p^5$ is so arranged that only one of such pinions $p^4$ or $p^5$ at a time is capable of engaging its spool-wheel $l^2$ or $m^2$, according to which spool it is desired to drive. The shaft $p$ of the compound or shunt wheel is capable of receiving endwise movement, in order to move the pinions $p^4 p^5$ into or out of gear with their respective spool-wheels $l^2$ $m^2$ or into a midway position out of gear with both; and in order to impart such endwise movement thereto we employ a vertical spindle $q$, at one end stepped in a bearing $q'$, formed on or fixed to the frame $a$ and at the other end rising through a bearing formed in a bracket $q^2$, fixed to the frame $a$ and projecting through the cover $b$, where it is provided upon its extreme end with a shunt-handle $q^8$, and upon this spindle $q$ we fix a lever $q^4$, which at one end engages an annular groove or recess $p^6$ in the shunt-shaft $p$ and at the other end is formed with a nose which engages one or other of three recesses or stops $q^5$, formed in one end of an arm $q^6$, which is at its other end mounted upon an axis of motion $q^7$, carried by the frame $a$, and is acted upon by a spring $q^8$, fixed to the frame $a$, in order to hold the recessed bar or plate $q^6$ in engagement with the nose of the lever $q^4$. By turning the shunt-handle $q^3$ to the extreme right or left the nose of the lever $q^4$ may be caused to engage either one of the recesses or stops $q^5$, and by moving endwise the shunt-shaft cause one of the pinions $p^4 p^5$ of the compound or shunt wheel to engage and give motion to either of the spools $l$ or $m$ through its toothed wheel $l^2$ or $m^2$, according to which of them it is desired to wind the ribbon $n$ upon, while by placing the shunt-handle $q^3$ in a central position the nose of the lever $q^4$ will be caused to engage the central one of the recesses or stops $q^5$, and the compound or shunt wheels $p^4 p' p^5$ will accordingly be held in a central position, so that no motion will be given to the ribbon-spools $l$ $m$, and the ribbon $n$ may be moved out of the way, and the machine may be employed to produce a stencil in waxed paper, as has heretofore been proposed. The shunt-shaft $p$ extends to the side of the machine, where it is provided with a crank-handle $p^{**}$, by means of which it may be rotated when it is desired to rotate one or other of the ribbon-spools $l$ $m$ without giving motion to the machine generally.

Having now particularly described and ascertained the nature of our said invention and in what manner the same is to be performed, we declare that what we claim is—

1. In a type-writing machine, the combination of a number of independent type-levers $c$, formed with cranked weighted heels $c^2$ and mounted upon axes of motion arranged in the arc of a circle and normally held in a vertical or approximately vertical position by their own gravity and at their ends furnished with long type-pieces $c'$, having several characters upon the face thereof, a number of key-levers $d$, mounted upon axes of motion, arranged in the arc of a circle to correspond with the type-levers $c$, and a cylindrical platen $f^{13}$, mounted in a frame $f$, connected by arms $g'$, and a rock-shaft $g^2$, with a lever $g^3$, adapted to receive a differential depression by pistons $h$ $h^*$ in order to bring the platen $f^{13}$ forward into position to receive the impression of the capitals or numerals of the type-pieces $c'$, substantially as herein shown and described.

2. In a type-writing machine, the combination of the platen $f^{13}$, mounted in a frame $f$, the arms $g'$, rock-shaft $g^2$, and lever $g^3$, the pistons $h$ $h^*$, capable of differential depression and provided with studs $h^2$, and the tubular guides $h^4$, formed with vertical and horizontal slots $h^5$ $h^6$, substantially as herein shown and described.

3. In a type-writing machine, the combination of a paper-carriage $f$, a caster-wheel $f'$ at the rear of such carriage, a table $a^{**}$, upon which the caster-wheel travels, a bar $g$, upon which the front of the carriage is mounted, with capability of sliding arms $g'$ connecting the bar $g$ with a rock-shaft $g^2$, a lever $g^3$, fixed to the rock-shaft $g^2$, and means for shifting the lever, substantially as herein shown and described.

4. In a type-writing machine, the combination of a curved spacing-bar $e$, located beneath the key-levers $d$ and mounted upon axes of motion at the rear of the machine, an escapement rack-bar $e^3$, fixed to the spacing-bar $e$ and provided with toothed racks $e^4$ $e^{4*}$, a paper-carriage $f$ at the rear supported upon a caster-wheel $f'$ and at the front supported with capability of sliding upon a bar $g$, connected by arms $g'$ with a rock-shaft $g^2$, to which is fixed a lever $g^3$, means for shifting the latter, two broad pallets $f^2\ f^3$, attached to the carriage $f$ and adapted to alternately engage the racks $e^{4*}\ e^4$, the pallet $f^2$ being fixed and the pallet $f^3$ movable, an arm $f^4$, mounted upon a shaft $f^6$ and on which the pallet $f^3$ is formed, a spring $f^5$ to retain the pallet $f^3$ normally in engagement with the rack $e^4$, an arm or offset $f^8$ upon the shaft $f^6$, a bell-crank lever $f^{10}$, mounted upon the end of the carriage and adapted to partially rotate the shaft $f^6$ and lift the pallet $f^3$ out of engagement with the rack $e^4$, and a spring-drum $j$ to draw the carriage forward, substantially as herein shown and described.

5. In a type-writing machine, the combination, with a vertically-movable escapement rack-bar $e^3$, a paper-carriage $f$, provided with broad pallets to engage the teeth $e^4\ e^{4*}$, of the rack-bar, a shaft $f^6$, connected with one of such pallets and provided with an offset $f^8$, a bell-crank lever $f^{10}$, mounted upon the end of the carriage and adapted to partially rotate the shaft $f^6$ and lift the pallet $f^3$ out of engagement with the rack $e^4$, a spring-drum $j$ to draw the carriage forward, a cylindrical platen $f^{13}$, mounted upon the carriage $f$ with capability of revolution, a ratchet-wheel $f^{16}$, fixed upon the platen $f^{13}$, a spring-stop $f^{16*}$ to regulate the movement of the platen, and a clawker or driver $f^{17}$, engaging the wheel $f^{16}$ and actuated by a bell-crank lever $f^{23}$, mounted upon the end of the carriage at the side of the lever $f^{10}$ and adapted to actuate the clawker or driver and rotate the platen, substantially as herein shown and described.

6. In a type-writing machine, the combination of a paper-carriage $f$, having a bar $f^{28}$, provided with a divided scale, a spring-drum $j$, connected with the carriage by a chain and provided with a circular scale corresponding with that of the paper-carriage and formed with a ring of holes $j^3$ therethrough, a loose pin $j^4$, to fit such holes, a bell or gong $j^5$, and a hammer or striker $j^7$, the latter fixed upon a flexible arm $j^9$ and provided with a nose or projection $j^8$, adapted to engage the lower end of the pin $j^4$ in the revolution of the drum $j$, substantially as herein shown and described.

7. In a type-writing machine, the combination, with a cylindrical platen $f^{13}$, of two ribbon-spools, one $l$ mounted upon an axis parallel with the platen and the other $m$ mounted upon an axis at an angle to the platen, a guide-bar $c^{14}$, carried by the arm $c^{10}$ and disposed at a corresponding angle to the spool $m$, a spur-wheel $l^2$, fixed to the spool $l$, a beveled wheel $m^2$, fixed to the spool $m$, a shaft $p$, mounted in bearings with capability of endwise and rotary motion, a ratchet-wheel $p'$, fixed upon such shaft, a pawl $p^2$, engaging the ratchet-wheel and carried by an arm $p^3$ of the rack-bar $e^3$, a spur-pinion $p^4$, fixed upon the shaft $p$ at one side of the ratchet-wheel $p'$ and adapted to engage the spur-wheel $l^2$, and a spiral pinion $p^5$, fixed upon the shaft $p$ at the other side of the ratchet-wheel $p'$ and adapted to engage the beveled wheel $m^2$, and means for moving the shaft $p$ endwise, substantially as herein shown and described.

8. In a type-writing machine, the combination of the two spools $l\ m$, one mounted upon an axis parallel to the platen $f^{13}$ and the other mounted at an angle thereto, the spur-wheel $l^2$ and beveled wheel $m^2$, fixed upon the spools, the shaft $p$, having the corresponding wheels $p^4\ p^5$ fixed thereon, a lever $q^4$, at one end engaging an annular groove in the shaft $p$ and at the other end engaging the notches $q^5$ of a spring-bar, and a handle $q^3$ to turn such lever and move the shaft $p$ endwise, substantially as herein shown and described.

MICHAEL HEARN.
MORGAN DONNE.

Witnesses:
C. MELBOURNE WHITE,
F. W. WOODINGTON.